3 Sheets--Sheet 1.

G. V. SHEFFIELD.
Machine for Inserting Fibrous Screw-Fastenings in Boots and Shoes.

No. 161,449.    Patented March 30, 1875.

WITNESSES:

INVENTOR:
G. V. Sheffield
BY
ATTORNEYS.

THE GRAPHIC CO.PHOTO-LITH.39 & 41 PARK PLACE,N.Y.

G. V. SHEFFIELD.
Machine for Inserting Fibrous Screw-Fastenings in Boots and Shoes.

No. 161,449. Patented March 30, 1875.

WITNESSES: INVENTOR:

UNITED STATES PATENT OFFICE.

GEORGE V. SHEFFIELD, OF NEW YORK, N. Y., ASSIGNOR TO SHEFFIELD SCREW-DRIVING MACHINE COMPANY, OF SAME PLACE.

IMPROVEMENT IN MACHINES FOR INSERTING FIBROUS SCREW-FASTENINGS IN BOOTS AND SHOES.

Specification forming part of Letters Patent No. 161,449, dated March 30, 1875; application filed March 1, 1875.

*To all whom it may concern:*

Be it known that I, GEORGE V. SHEFFIELD, of the city, county, and State of New York, have invented a new and Improved Machine for Driving Fibrous Screw-Fastenings in Boot and Shoe Soles, and other leather and analogous goods, of which the following is a specification:

My invention consists of a machine for fastening on shoe-soles—also fastening together two or more pieces in all kinds of leather-work, also pieces of rubber and other analogous substances—by screws made of petrified hide or other animal fiber, the said machine being essentially a combination of a boring-tool for making the holes, also feeding the work along, if preferred, a screw-tap for cutting the threads in the holes, a chuck for inserting the screws, and cutters for cutting off the screws after they are inserted, together with apparatus for operating the said devices. It also consists of these instrumentalities so contrived that the boring-tool, tap, and chuck move up to the place for operating on the work, perform their part, and then move away, while the work remains in position for work in which the fastenings are to be inserted in curved and irregular lines.

Figure 1:
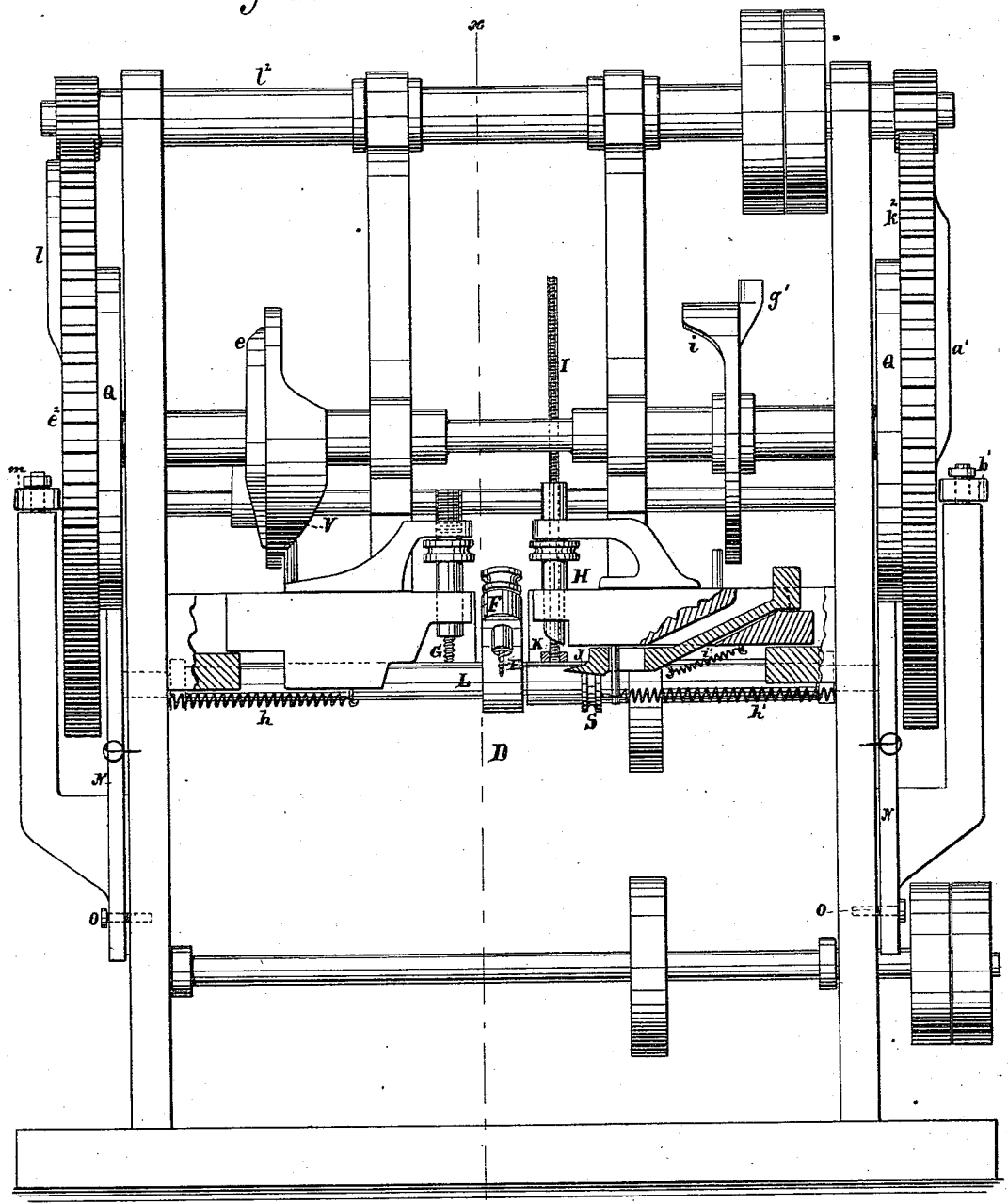
Figure 2:
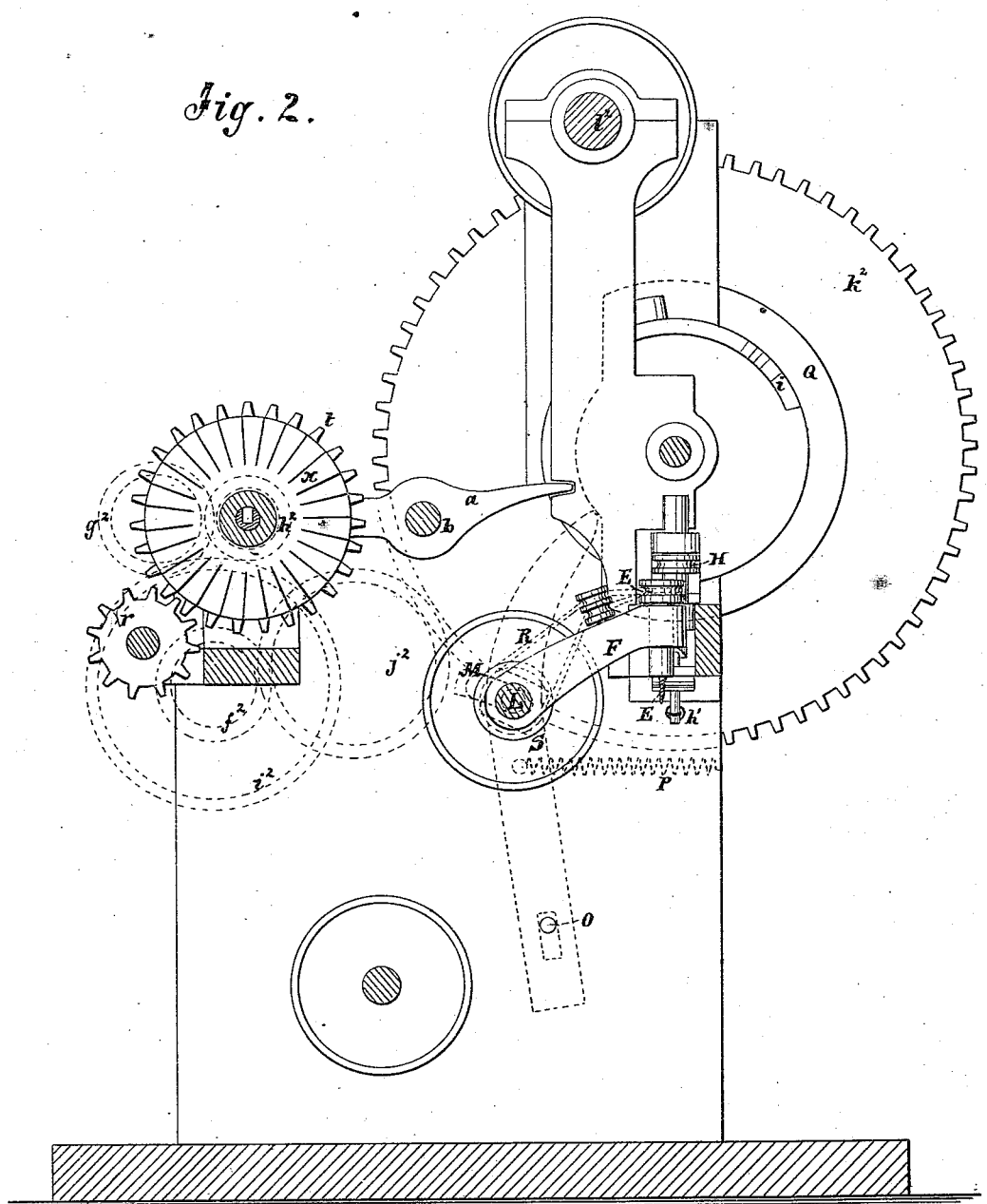
Figure 3:
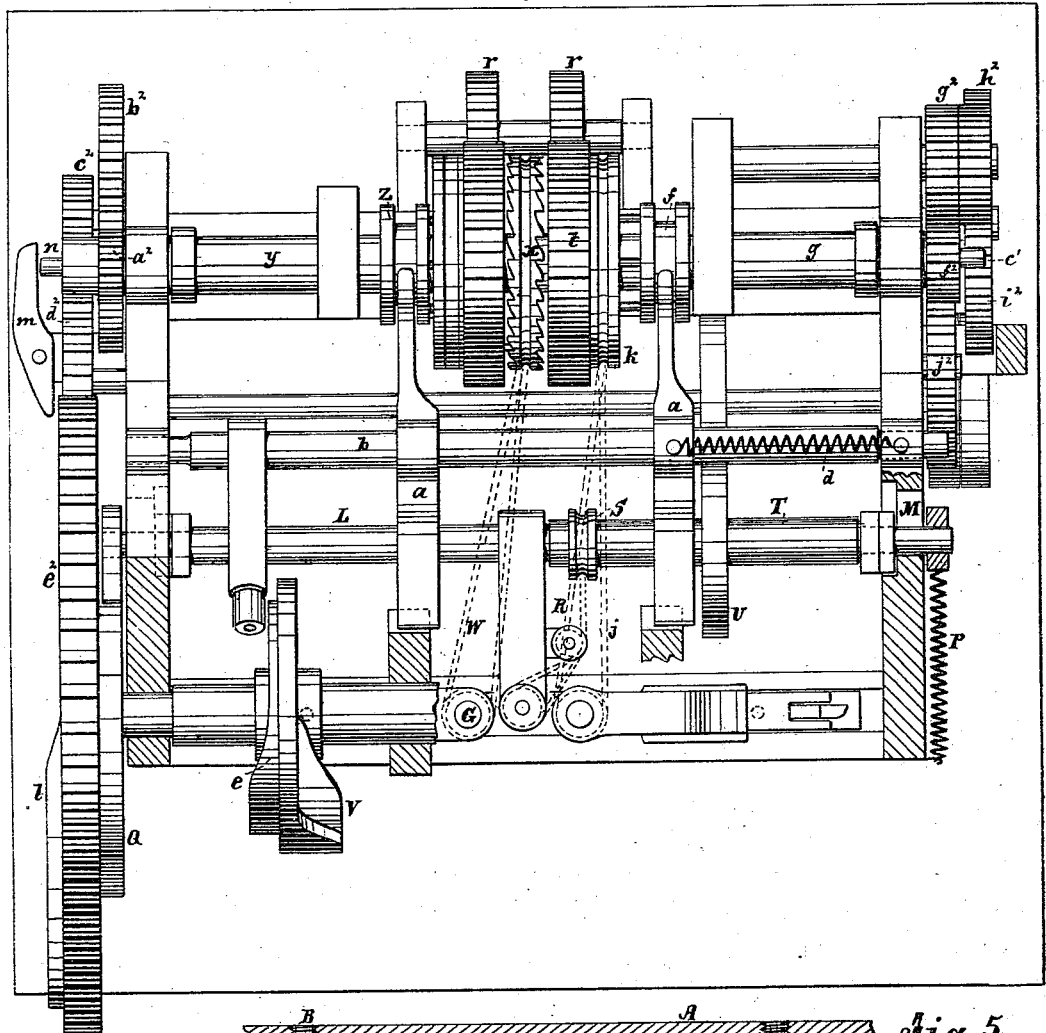
Figures 4, 5:
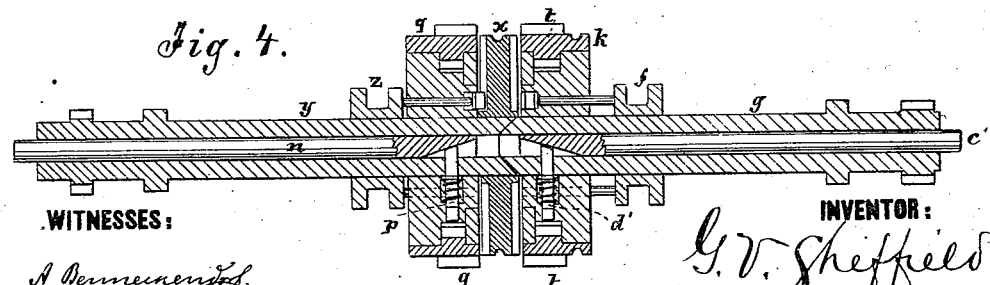

Figure 1 is a front elevation of my improved machine, with some parts sectioned. Fig. 2 is a transverse sectional elevation taken on the line $x\ x$ of Fig. 1. Fig. 3 is a horizontal section. Fig. 4 is a section through the apparatus for revolving the boring-tool, tap, and chuck; and Fig. 5 represents two pieces of sole-leather fastened together in the manner the machine is intended to do it.

Similar letters of reference indicate corresponding parts.

A, Fig. 5, represents two pieces of leather fastened together by screws B, of petrified rawhide or other animal fiber, according to my invention. In practice, the sole of the shoe or other leather pieces to be fastened will be held under the machine at D by any suitable means, so as to be fastened and fed along intermittingly as the fastenings are inserted. The holes are bored by a drill, E, in an arm, F, which drops down at the proper time onto the work and bores the holes for the screw. While boring the hole, or preferably before, it swings laterally and feeds the work along. The drill then rises out of the way, and the tap G slides forward to the right over the hole made by the drill, and screws down into the hole and up out of it again, to make the thread. Then it slides back to the left out of the way, and the universal chuck H, holding the fastening-screw I, moves forward to the left over the hole, and screws the screw into it. The chuck then, in the practical machine, opens and releases the screw, and moves up along it a certain distance, leaving it extended the length to be inserted, ready for the next operation. The cutter J then moves forward against the screw just over the work, and cuts it off. The chuck will, in practice, turn the screw backward a little to screw it up in a nut, K, which will be provided in the working machine, to repair any damage that may be done by the cutter to the thread at the end cut off, so that it will enter the next hole, which it might fail to do if the thread remained in the condition in which it was left by the cutter. The arm F, which carries the drill E, is mounted on a rod, L, which extends, through the inclined slots M in the housings of the machine, into the levers N, which vibrate and also rise and fall on the pivots O to present the drill to the work, and cause it to feed the work along; also to take the drill away from the work to allow the other tools to act. The arm is moved forward for the drill to engage the work by the springs P, and the drill goes down to bore into it by the rod L sliding down the inclined slots. The cams Q move the drill back to raise it out of the work.

The drill is turned, by the belt R from the pulley S, on a sleeve, T, on the rod, the sleeve being turned by a belt working on the pulley U. The cam V slides the tap forward over the work, and the belt W from the loose pulley X turns it first one way for screwing it in the hole, and then the other way for withdrawing it. This pulley is turned forward to screw in the tap by the shaft Y, which is connected with the pulley during part of the time that the tap is engaged with the work by the clutch Z, arm $a$, rod $b$, and spring $d$; but before the cam V lets the tap slide back the cam $e$ disconnects clutch Z, and connects clutch $f$ of shaft $g$, which turns reversely to shaft Y, and screws the tap out of the hole. The cam $e$ then lets the tap slide back by the spring $h$, and the cam $i$ slides the chuck H forward to insert the screw I. The chuck is turned in the forward direction for inserting the screw by the belt $j$ and pulley $k$, which are set in motion at the proper time by the cam $l$, lever $m$, rod $n$, and spring-catch $p$, which connect toothed rim $q$ with the shaft Y, so as to be turned, and it turns the pulley through the wheels $r$ and the toothed rim $t$. When the screw has been screwed in far enough the chuck is reversed and run back on the screw, for which it will, in practice, be contrived to open and release the screw by the pulley $k$ being connected with shaft $g$, $q$ being at the same time disconnected from its shaft, so as to turn loose.

The connection of pulley $k$ is effected by cam $a^1$, lever $b^1$, rod $c'$, and spring-catch $d^1$, which, in the practical machine, will come into action at the moment the similar devices connecting toothed wheel $q$ release it.

When the chuck is turned back along the screw the proper distance for the length to be screwed in at the next operation, it will, in practice, be caused to close on the screw to screw the cut end back into the nut K, to be provided, as before stated, to smooth and perfect any portion of the thread that may be mutilated by the cutting, so that it will not be obstructed in screwing into the next hole; but before this takes place the cutter J will be moved forward by the cam $g'$ to cut off the screw. The chuck will then be pulled back by its spring $h'$, and the cutter will also be pulled back by its spring $i^1$, when the boring-tool will be again set in motion, as before, and the other operations, as above described, will be repeated. The nut K will move forward and backward with the chuck.

The contrivances for operating the boring, tapping, inserting, and cutting-off tools may, of course, be changed in various ways without departing from the spirit of my invention, the essential feature of which consists of these instrumentalities, combined to insert screws in the manner described. For straight work they may be arranged in a line, so that the work will feed along from the boring-tool to the tap, and from the tap to the inserting-tool; but when the work is not straight it is essential that they be so arranged as to perform their parts while the shoe or other work remains in one and the same position for each screw inserted, which is necessary because the lines in which the screws are to be inserted—particularly in boots and shoes—are so curved and irregular that the turning of the work for one tool would throw it out of line for the others.

The boring-tool and tap may, if preferred, be combined in one tool; and, instead of using the boring-tool to feed the work, a special feed may be provided; but it is probably simpler to utilize it for feeding.

The shaft Y is turned by the tram $a^2\ b^2\ c^2\ d^2$ and the large wheel $e^2$; and the shaft $g$ is turned by the tram $f^1\ g^2\ h^2\ i^2 j^2$, and the large wheel $K^2$, and these two large wheels are geared with the driving-shaft $l^2$.

Having thus described my invention, I claim as new and desire to secure by Letters Patent—

1. The combination, in a machine for fastening shoe-soles and other work with screws of fibrous material, of a boring-tool to make the holes for the screws, a screw-tap for screw-threading the holes, a chuck for inserting the screws, a cutter for cutting off the inserted screws, and suitable apparatus for operating the different instrumentalities in the order described, substantially as specified.

2. The combination, in a machine for fastening the soles and other work with screws of fibrous material, of a boring-tool to make the holes, a screw-tap for screw-threading the holes, a chuck for inserting the screws, a cutter for cutting off the inserted screws, and apparatus for operating them all, adapted to effect the several operations described for each successive screw in one and the same place, while the work remains in one and the same position, all substantially as and for the purpose specified.

3. The boring-tool, combined with the rod L, arranged in the inclined slots or bearings M and vibrating and rising and falling levers N, substantially as specified.

4. The combination with the sliding screw-tap G, of pulley X, clutches Z and $f$, and the reversely-turning shafts Y and $g$, substantially as specified.

5. The combination with the sliding chuck H, of the pulley K, toothed rim $t$ and $q$, wheels $r$, spring catches $b\ d^1$, reversely-turning shafts Y and $g$, and the mechanism for working the spring-catches, substantially as specified.

GEORGE V. SHEFFIELD.

Witnesses:
T. B. MOSHER,
C. SEDGWICK.